UNITED STATES PATENT OFFICE 2,409,287

UNSATURATED AMINES AND PROCESS FOR MAKING SAME

Morris S. Kharasch and Charles F. Fuchs, Chicago, Ill., assignors to Eli Lilly and Company, Indianapolis, Ind., a corporation of Indiana No Drawing. Application January 4, 1943, Serial No. 471,294

14 Claims. (Cl. 260—583)

It is the object of our invention to provide a new and simple synthesis for substances which provide the side chains of various useful final products, including anti-malarials and other useful medicinal products; and to produce various new substances by that synthesis.

Four steps are involved in the total synthesis. The present application is directed only to the first of these four steps, and the products produced by that first step; and other steps, and substances produced by them, form the subject-matter of co-pending applications which we have filed. Therefore, that first step is described in detail, and the second, third, and fourth steps are referred to only incidentally. It suffices to say at this point that each of the first, third, and fourth steps results in substances which as a class have not been previously prepared, and are new with us; and that the second step results in substances which as a class, except for one species, have not been previously prepared and are new with us.

These four steps respectively produce products as follows:

*First step.*—Production of unsaturated amines, of the following general formula:

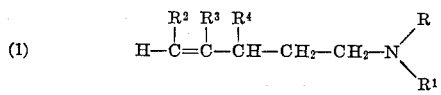

in which R and $R^1$ represent radicals of the class consisting of (a) alkyl radicals which together have not to exceed 8 carbon atoms and which may be interconnected to form with the nitrogen to which they are attached a heterocyclic ring of either 5 or 6 members, and (b) alicyclic radicals, and $R^2$, $R^3$, and $R^4$ each represents a member of the class consisting of hydrogen and alkyl radicals of not to exceed 3 carbon atoms. All these unsaturated amines are new.

The second step produces saturated halides; the third step produces phthalimido derivatives; and the fourth step produces saturated diamines.

The procedures involved in the four steps are in general as follows:

*Step 1.—Preparation of unsaturated amines*

This synthesis is by the following general course:

An allyl halide (chloride or bromide), or substituted allyl halide with an alkyl substituent of not to exceed 3 carbon atoms on one or more of its carbon atoms, is caused to react with magnesium, in ether or dioxane or other appropriate solvent, to produce the corresponding Grignard reagent, according to the following equation:

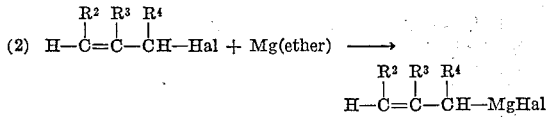

in which $R^2$, $R^3$, $R^4$, and Hal have the same significance as before. When Hal is bromine, the Grignard reagent is soluble in ether; but when Hal is chlorine the Grignard reagent is insoluble in ether. For that reason chemists in general have preferred to use such Grignard reagents when Hal is bromine, because a seemingly unworkable solid mass separated out when Hal was chlorine. In consequence much work has been done on such Grignard reagents when Hal is bromine; but practically none when Hal is chlorine. As a matter of fact, it has not even been established heretofore that the solid which separates is a pure Grignard reagent, or (what is more important) that it can be used in syntheses. We have found, however, that these solids are Grignard reagents, and highly effective ones, superior in many respects (in that better yields are obtained) to the corresponding Grignard reagents when Hal is bromine. This superiority, coupled with the low cost of the organic chlorides as compared with the organic bromides, makes our synthesis especially attractive commercially when allyl chlorides or substituted-allyl chlorides are used.

The Grignard reagent thus obtained is caused to react with a 1-chloro-2-dialkylaminoethane, according to the following equation:

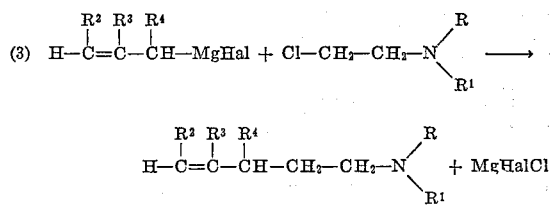

in which R, $R^1$, $R^2$, $R^3$, $R^4$, and Hal have the same significance as before.

When Hal is chlorine, it is found that the yields are greater than when Hal is bromine; but our invention contemplates the use of either.

The product obtained by Equation 6 above is our unsaturated amine of Formula 1 above. All species of it are believed, after a careful search, to be new with us.

In the preparation of the unsaturated amine, it is possible to carry the whole procedure out in one step, by dissolving the allyl halide or substituted allyl halide (preferably the chloride) and the 1-chloro-2-dialkylaminoethane in ether, and allowing them to react with magnesium. The magnesium is conveniently suspended in the ether first, and a mixture of the two reactants dropped into that ether. It is possible that in this procedure the reactions of Equations 5 and 6 take place seriatim; but in any case reaction occurs to give the desired unsaturated amine in very high yields.

Step 2.—*Preparation of saturated halides, by addition of hydrogen halide to unsaturated amines produced by Step 1*

Step 3.—*Preparation of phthalimido derivatives of saturated halides of Step 2*

The saturated halide produced by Step 2 is treated with potassium or sodium phthalimide— preferably in a suitable solvent, such as xylene or methyl naphthalene, and heated to 150° to 165° C. (bath temperature) for several hours.

Step 4.—*Preparation of saturated diamines, by hydrolysis of phthalimido derivatives produced by Step 3*

The phthalimido derivative, produced by Step 3, is hydrolyzed with a non-oxidizing mineral acid, such as hydrochloric, hydrobromic, sulfuric, or phosphoric acid. For instance, it is dissolved in an excess of concentrated hydrochloric acid, and heated in an oil bath for several hours at about 130° to 150° C., during which hydrolysis occurs.

The following are examples of our invention:

To Make the Unsaturated Amines of Formula 1

Example 1

Diethyl-β-chloroethylamine (0.317 mole) is slowly added to a solution of allylmagnesium bromide (0.348 mole) in ether (300 cc.). The reaction mixture is kept refluxing during the addition of the amine, which should take about an hour, and for about three hours longer, desirably under pressure to raise the boiling point of the ether to about 50° C. The reaction mixture is then allowed to stand for a few hours, conveniently overnight, and is then poured on crushed ice (about 300 g.). A concentrated solution of sodium hydroxide (about 40 g.) is then added, and the whole is subjected to steam distillation. The first 500 cc. of distillate contain the reaction product. This distillate is extracted with ether, and the ether extract is dried with sodium sulfate and filtered. The ether is removed by evaporation, and the residue is subjected to distillation at reduced pressure. The distillate (69% of calculated) is the new compound 5-diethylaminopentene-1, which has the following formula:

(4) 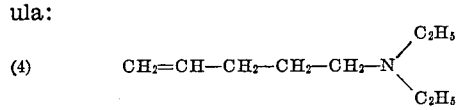

This is a colorless liquid, lighter than water, and has a boiling point of 62.5°–64° C. at 31 mm. of mercury and of 52°–55° C. at 20 mm. of mercury. The index of refraction is $N_D^{20°}$ 1.4300.

5-diethylaminopentene-1 reacts with ethyl iodide to form a quaternary salt of the following formula:

(5) 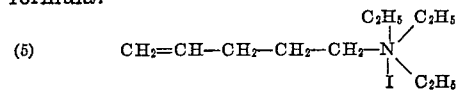

which after crystallization from dry acetone has a melting point of 147°–148° C. 5-diethylaminopentene-1 similarly reacts with halogen acids to form salts. The yield of the 5-diethylaminopentene-1 is about 69% of the calculated.

Example 2

Allyl chloride (0.523 mole) dissolved in ether (200 cc.) is slowly added, under continuous stirring over a period of 3 hours, to magnesium (30 g.) suspended in ether (100 cc.). A white precipitate separates (presumably allyl magnesium chloride), which is kept suspended in the ether by stirring.

To this suspension is slowly added diethyl-β-chloroethylamine (0.296 mole) over a period of about an hour, with the mixture heated to the refluxing temperature during the period of that addition and for at least a half-hour longer. During all this time the mixture is vigorously agitated. Then the mixture is allowed to stand for several hours, conveniently over night; and then is worked up in the manner described in Example 1. The product obtained is 5-diethylaminopentene-1, as in Example 1, but the yield is 81% of the calculated.

Example 3

Diethyl-β-chloroethylamine (0.390 mole) and allyl chloride (0.500 mole) are dissolved in ether (150 cc.). This solution is added slowly, with continuous stirring, to a suspension of magnesium turnings (1.0 mole) in ether (50 cc.). The rate of the addition is so regulated that the mixture is kept refluxing by its own heat of reaction; and it usually requires about two and one-half hours for such addition. The mixture is desirably maintained under reflux conditions and stirred for about one hour longer. Then it is worked up as described in Example 1. The product obtained is 5-diethylaminopentene-1, as in Example 1; and the yield is about 75%–90% of the calculated.

Example 4

2-methylallyl chloride (0.772 mole) dissolved in ether (200 cc.) is slowly added to a suspension of magnesium turnings (50 g.) in ether (100 cc.), over a period of about 3 hours. This forms a white ether-insoluble precipitate, which is presumably 2-methylallylmagnesium chloride. Without isolating this compound, diethyl-β-chloroethylamine (0.331 mole) is slowly added to the mixture; with stirring, and with heating to the refluxing temperature, during the addition. Desirably the addition is timed to require about an hour, and the heating and stirring are continued for about 3 hours longer. The mixture is then poured on ice (300 g.); and is worked up in the same manner as is the product described in Example 1. The compound formed is 5-diethylamino-2-methylpentene-1; which has the following formula:

(6) 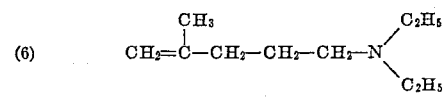

Its boiling point is 75°–77° C. at 25 mm. of mercury. The yield is about 75% of the calculated.

Example 5

Example 4 is repeated, except that crotyl chloride is used instead of 2-methylallyl chloride.

The product obtained is 6-diethylaminohexene-2; which has the following formula:

(7) 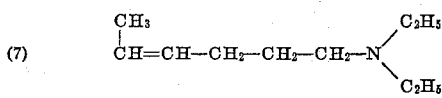

Its boiling point is 73°–75° C. at 31 mm. of mercury. The yield is about 75–78% of the calculated.

*Example 6*

Example 4 may be repeated, except that cinnamyl chloride is used instead of 2-methylallyl chloride. The resultant compound is 5-diethylamino-1-phenylpentene-1; which has the following formula:

(8) 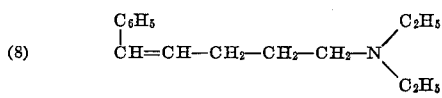

*Example 7*

Example 4 is repeated, save that 1-methylallyl chloride is used instead of 2-methylallyl chloride. The product obtained thereby is 5-diethylamino-3-methylpentene-1; and has the following formula:

(9) 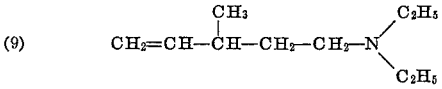

*Example 8*

Any of the preceding examples may be repeated, but with the ethyl group or a propyl group as any of $R^2$, $R^3$, and $R^4$.

*Example 9*

Any of the preceding examples may be repeated, save that either or both of R and $R^1$ may be either the methyl group, the propyl group, or other alkyl groups so long as the total carbon atoms in R and $R^1$ does not exceed 8.

*Example 10*

Any of the preceding Examples 1 to 8 may be repeated, save that either or both of R and $R^1$ is an alicyclic group, such for instance as the cyclopentyl group or the cyclohexyl group.

For instance:

Instead of condensing a diethyl-β-chloroethylamine with the appropriate Grignard reagent, we condense therewith instead ethylcychloexyl-β-chloroethylamine. This produces compounds of the following general formula:

(10) 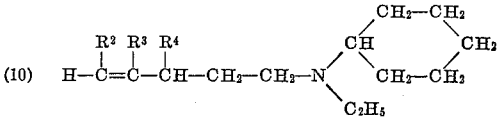

*Example 11*

Any of the Examples 1 to 8 may be repeated, save that instead of condensing diethyl-β-chloroethylamine with the appropriate Grignard reagent, we condense therewith instead N-β-chloroethylpiperidine, N-β-chlorethylmethylpiperidine (whether the methyl group is in the α or the β or the γ position on the piperidine ring), or N-β-chloroethylpyrrolidine. These produce compounds of the following general formulas:

(11) 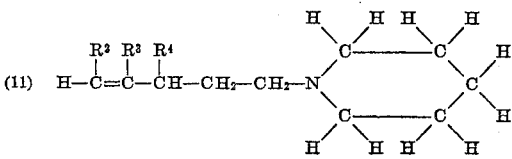

If in such a compound $R^2$, $R^3$, and $R^4$ are all hydrogen atoms, the compound has a boiling point of 89°–95° C. at a pressure of 30–33 mm. of mercury.

(12) 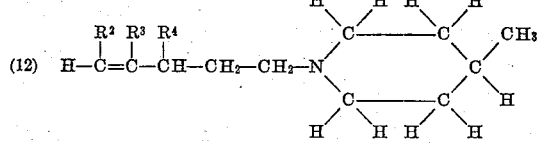

If in such a compound $R^2$, $R^3$, and $R^4$ are all hydrogen atoms, and the methyl group on the piperidine ring is in the γ position, the compound has a boiling point of 92°–97° C. at a pressure of 30–34 mm. of mercury.

(13) 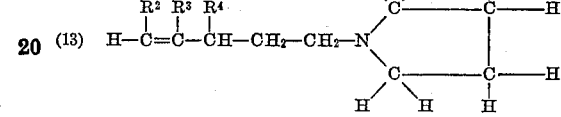

If in such a compound $R^2$, $R^3$, and $R^4$ are all hydrogen atoms, the compound has a boiling point of 80°–86° C. at a pressure of 30–34 mm. of mercury.

The making of the saturated halides of Step 2, the phthalimido derivatives of Step 3, and the saturated diamines of Step 4, of the complete synthesis, are not directly involved in the present application, and so will not here be directly described in detail. They are set forth in our aforesaid co-pending applications.

We claim as our invention:

1. The process of making compounds of the following general formula:

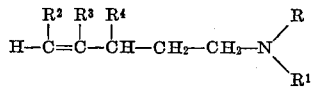

in which R and $R^1$ represent radicals of the class consisting of (a) alkyl radicals which together have not to exceed 8 carbon atoms when they are not interconnected but which when they are interconnected form with the nitrogen to which they are attached a heterocyclic ring of the class consisting of 5 and 6 members, and (b) alicyclic radicals, and $R^2$, $R^3$, and $R^4$ each represents a member of the class consisting of hydrogen and alkyl radicals of not to exceed 3 carbon atoms, which consists in causing a reaction in the presence of magnesium and an ether between a compound of the following general formula:

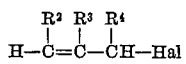

in which Hal represents one of the halogens chlorine and bromine, and a compound of the following general formula:

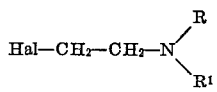

2. The new compounds having the following general formula:

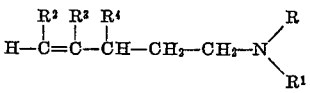

in which R and $R^1$ represent radicals of the class consisting of (a) alkyl radicals which together have not to exceed 8 carbon atoms when they are not interconnected but which when they are interconnected form with the nitrogen to which they are attached a heterocyclic ring of the class consisting of 5 and 6 members, and (b) alicyclic radicals, and $R^2$, $R^3$, and $R^4$ each represents a member of the class consisting of hydrogen and alkyl radicals of not to exceed 3 carbon atoms.

3. The process as set forth in claim 1, in which each of $R^2$, $R^3$, and $R^4$ is hydrogen.

4. The process as set forth in claim 1, in which each of R and $R^1$ is ethyl.

5. The process as set forth in claim 1, in which each of $R^2$, $R^3$, and $R^4$ is hydrogen, and each of R and $R^1$ is ethyl.

6. The process as set forth in claim 1, in which each of $R^2$ and $R^4$ is hydrogen, and $R^3$ is methyl.

7. The process as set forth in claim 1, in which each of $R^3$ and $R^4$ is hydrogen, and $R^2$ is methyl.

8. The new compound as set forth in claim 2, in which each of $R^2$, $R^3$, and $R^4$ is hydrogen.

9. The new compound as set forth in claim 2, in which each of R and $R^1$ is ethyl.

10. 5-diethylaminopentene-1.

11. The new compound as set forth in claim 2, in which each of $R^2$ and $R^4$ is hydrogen, and $R^3$ is methyl.

12. The new compound as set forth in claim 2, in which each of $R^3$ and $R^4$ is hydrogen, and $R^2$ is methyl.

13. 5-diethylamino-2-methylpentene-1.

14. 6-diethylaminohexene-2.

MORRIS S. KHARASCH.
CHARLES F. FUCHS.